United States Patent
Wong

(10) Patent No.: US 7,762,274 B2
(45) Date of Patent: Jul. 27, 2010

(54) HYDRANT VALVE PILOT WITH DETACHABLE ACTUATOR

(75) Inventor: Tak-Yiu Wong, Cerritos, CA (US)

(73) Assignee: Eaton Corporation, Cleveland, OH (US)

( * ) Notice: Subject to any disclaimer, the term of this patent is extended or adjusted under 35 U.S.C. 154(b) by 482 days.

(21) Appl. No.: 11/307,606

(22) Filed: Feb. 14, 2006

(65) Prior Publication Data

US 2007/0186977 A1    Aug. 16, 2007

(51) Int. Cl.
*F16K 1/12* (2006.01)
(52) U.S. Cl. .................. 137/219; 251/291
(58) Field of Classification Search ............. 137/105, 137/115.07, 115.19, 115.23, 219, 222; 251/291
See application file for complete search history.

(56) References Cited

U.S. PATENT DOCUMENTS

| | | | | | |
|---|---|---|---|---|---|
| 3,172,420 | A | * | 3/1965 | Brown et al. | 137/219 |
| 3,173,441 | A | * | 3/1965 | Elbogen et al. | 137/220 |
| 3,290,003 | A | * | 12/1966 | Kessler | 251/318 |
| 3,298,390 | A | * | 1/1967 | De Graaf | 137/459 |
| 3,500,864 | A | * | 3/1970 | Elbogen et al. | 137/614.19 |
| 3,838,707 | A | * | 10/1974 | Wachowitz, Jr. | 137/312 |
| 4,135,546 | A | * | 1/1979 | Morrison | 137/315.28 |
| 4,303,093 | A | * | 12/1981 | Swindler | 137/315.01 |
| 4,479,507 | A | * | 10/1984 | Nichols | 137/220 |
| 5,957,148 | A | * | 9/1999 | Sell | 137/115.21 |
| 6,041,804 | A | * | 3/2000 | Chatufale | 137/15.23 |
| 6,460,826 | B1 | * | 10/2002 | Rezvani | 251/291 |
| 6,684,897 | B2 | * | 2/2004 | Sundararajan | 137/15.19 |

* cited by examiner

*Primary Examiner*—John Rivell
*Assistant Examiner*—Craig M Schneider
(74) *Attorney, Agent, or Firm*—Bradley J. Diedrich; Kelly Lowery & Kelley, LLP

(57) ABSTRACT

A pilot valve actuator for use with a hydrant valve has a pilot valve and a removable actuator. The pilot valve blocks communication between a primary hydrant chamber and a piston chamber when in a closed position. Under pressure, the actuator opens the pilot valve against its biasing force permitting the flow of fluid between the hydrant chamber and the piston chamber. The pilot valve is permanently attached to the hydrant valve. The actuator is removable from the pilot valve by a quick disconnect mechanism permitting storage of the actuator remote from the hydrant valve.

15 Claims, 5 Drawing Sheets

HYDRANT VALVE PILOT WITH DETACHABLE ACTUATOR

BACKGROUND OF THE INVENTION

This invention relates to hydrant valves or shut-off valves commonly used in aircraft fueling. More particularly, this invention relates to a pilot valve actuator for opening or closing a hydrant valve.

A hydrant valve used in aircraft fueling delivers fuel by connecting fuel storage through an underground pipeline at its inlet to an aircraft through a fueling vehicle equipped with a hydrant valve coupler and hose system at its outlet. For safety reasons, to avoid a collision with an aircraft or a supporting vehicle around the aircraft, hydrant valves are, as a rule, installed in a hydrant pit below ground level. A hydrant valve is designed to be opened or closed by the fueling operator from a distance. This requirement is causal so that if a fuel spill occurs in the vicinity of the hydrant pit, the fueling operator has the ability to terminate the flow of fuel by closing the hydrant valve from a safe distance.

Since electric power is normally lacking in the hydrant pit due to the concern over ignition of the fuel, the hydrant valve cannot be controlled electromechanically. The most commonly accepted method for controlling the opening and closing of hydrant valves is the utilization of pressure, either pneumatic or hydraulic, such that the fueling operator can apply or vent pressure to the hydrant valve through a handle valve and command hose which is commonly called a "deadman". Due to the high pressure and flow rates sustained by hydrant valves, practically all hydrant valves are pilot operated; that is, the main hydrant valve will be opened or closed by actuating a smaller pilot valve installed in the main hydrant valve.

In prior art hydrant valves, a pilot valve actuator is permanently installed directly on the body of the main hydrant valve. Pneumatic or hydraulic pressure is applied to the actuator through a quick disconnect pressure fitting.

FIG. 1 depicts a prior art hydrant valve 10. The hydrant valve includes a hydrant body 12 which encloses a primary hydrant chamber 14. This hydrant chamber 14 is connected to an inlet 16 and an outlet 18. The hydrant body 12 is secured to a fixed rigid surface by means of connectors 13. A fuel supply (not shown) is introduced to the hydrant chamber 14 through the inlet 16. A fueling vehicle (not shown) receives fuel from the hydrant valve 10 through the outlet 18.

A piston 20 is located within the hydrant chamber 14 and movable between opened and closed positions relative to the inlet 16. When the piston 20 is in the closed position, it prevents the flow of fuel through the inlet 16. A chamber 22 is located within the piston 20. The piston chamber 22 is in communication with the inlet 16 through a passageway 24. The piston chamber 22 is isolated from the hydrant chamber 14 by seals 26 and 28 and a pilot valve 30 as will be described below. Because the piston chamber 22 is in communication with the inlet 16, the pressure within the chamber 22 is equalized with the pressure in the inlet 16. In addition, because the chamber 22 is isolated from the hydrant chamber 14 as described, the pressure in the hydrant chamber 14 is negligible. The piston 20 remains in the closed position because of the equalized pressure exerted in the piston chamber 22 and the opposing pressure exerted in the inlet 16 (see arrows in FIG. 1).

The hydrant valve 10 also includes a pilot valve 30 and an actuator 40. The pilot valve 30 and actuator 40 are essentially permanently attached to the hydrant valve 10 in that they cannot be removed without disassembly of the system. As shown in FIG. 2, the prior art pilot valve 30 blocks communication between the hydrant chamber 14, the piston chamber 22, and the passageway 24. The pilot valve 30 comprises a pilot valve stem 32, a pilot valve seat 34 and a pilot valve return spring 36. The pilot valve return spring 36 biases the pilot valve stem 32 in a closed position against the pilot valve seat 34. The pilot valve 30 also includes pilot openings 38 adjacent the pilot valve seat 34. When the pilot valve stem 32 is against the pilot valve seat 34, flow through the pilot openings 38 is obstructed. The prior art actuator 40 comprises a pressure supply adaptor 42, an actuator plunger 44, an actuator plunger stem 46, and an actuator plunger return spring 48. The pressure supply adaptor 42 includes a quick disconnect connector 43 to connect a source of pressure medium (not shown), i.e., pneumatic or hydraulic fluid. The actuator 40 is sealed to prevent the transfer of pressure medium from the actuator 40 to the pilot valve 30.

In the absence of a pressure supply, the actuator plunger return spring 48 biases the actuator plunger 44 in a closed position. When the actuator plunger 44 is in the closed position the actuator plunger stem 46 extends into the pilot valve 30. The actuator plunger stem 46 is connected to the pilot valve stem 32. The combination of the biasing forces from the actuator plunger return spring 48 and the pilot valve return spring 36 bias the pilot valve stem 32 in a closed position against the pilot valve seat 34.

When a pressure medium is introduced through the pressure supply adaptor 42, the actuator plunger 44 is moved into an open position against the biasing force of the actuator plunger return spring 48. When the actuator plunger 44 moves into the open position, the actuator plunger stem 46 is withdrawn from the pilot valve 30. As the actuator plunger stem 46 is withdrawn from the pilot valve 30, the pilot valve stem 32 is moved from the closed position to the open position against the biasing force of the pilot valve return spring 36. As the pilot valve stem 32 moves away from the pilot valve seat 34, the pilot openings 38 are uncovered. The pilot openings 38 permit communication between the hydrant chamber 14, the piston chamber 22 and the passageway 24. When the hydrant chamber 14, piston chamber 22 and passageway 24 are connected the once equal pressure in the piston chamber 22 and the inlet 16 are made unequal permitting the pressure of the fuel supply in inlet 16 to move the piston 20 into an open position. In this way, fuel is permitted to move from the inlet 16 through the hydrant chamber 14 to the outlet 18.

This prior art hydrant valve presents a number of disadvantages. First, as previously mentioned, hydrant valves are normally installed in an open hydrant pit below ground level. This open exposure to the environment introduces various contaminants into the pit, such as water, spilled fuel, debris, abrasives, etc. While the main hydrant valve itself is relatively well-sealed against such contaminants, the pilot valve and its actuator are easily damaged by the contaminants due to their mechanical nature and the need to be open to the atmosphere.

Second, there are various means of applying the pressure necessary to activate a pilot valve actuator. The pressure could be supplied pneumatically using pressurized air from a compressor on the fueling vehicle. The pressure could also be supplied hydraulically utilizing pressurized fluid stored on the fueling vehicle. In some airports, some vehicles may use pneumatic pressure and other vehicles may use hydraulic pressure. In the prior art hydrant valves described above where the actuator is permanently affixed, various pressure media, i.e., air, fuel, oil, that remains in an actuator may be ingested into fueling vehicles causing cross-system contamination. Such contamination may cause equipment failure in the fueling vehicles.

Third, is a financial concern. It is inefficient for every hydrant valve in an airport to be equipped with a relatively expensive actuator. In the traditional setup, each hydrant valve at an airport carries a pilot valve and actuator. The work involved in maintaining and repairing the actuators on each hydrant valve at a single airport could pose a huge logistical problem. A single airport can have hundreds of hydrant valves. While many airports typically have hundreds of hydrant valves they have only a few tens of fueling vehicles to support them. It would be substantially less expensive to remove the actuator from the hydrant valve and install it on the fueling vehicles such that only a few tens of actuators would be required to control the hundreds of hydrant valves at an airport. This would reduce the initial investment required as the number of actuators are reduced and would also reduce the maintenance costs.

Accordingly, there is a need for a hydrant valve wherein the actuator is not exposed to contaminants by its constant presence in the open hydrant pit. Additionally, there is a need for a hydrant valve where an actuator will not be activated by different pressurized media thereby avoiding cross-system contamination. Further, there is a need for a hydrant valve that is economical in that only enough actuators are present to account for each fueling vehicle connectable to the hydrant valves. The present invention fulfills these needs and provides other related advantages.

SUMMARY OF THE INVENTION

The present invention relates to a pilot valve actuator for use with a hydrant valve. In particular, the invention provides for a hydrant valve including a primary hydrant chamber having an inlet and an outlet, a piston in the hydrant chamber movable between open and closed positions relative to the inlet, and a chamber disposed within the piston in communication with the inlet. A pilot valve is disposed between the primary hydrant chamber and the piston chamber, and an actuator is connected to the pilot valve. The actuator is removably connected to the pilot valve for selectively opening the pilot valve and thereby causing the piston to move from the closed to open position. The actuator is connectable to the pilot valve by a quick disconnect mechanism comprising an actuating collar, a collar return spring and latching elements on the actuator. The latching elements are mated to a connector on the pilot valve. The latching elements and mating connector may comprise latching lugs, threaded screws or a ball latch.

The actuator may be removed from the hydrant valve when the hydrant is not in use. The actuator may be controlled using pneumatic or hydraulic pressure and the actuator is sealed to prevent the transfer of actuator medium, i.e., pneumatic or hydraulic fluid, from the actuator to the pilot valve.

The pilot valve comprises a connector, a pilot valve stem, a pilot valve seat, a pilot valve return spring and a spring retainer. The mating of the pilot valve stem to the pilot valve seat when in the closed position blocks communication between the primary hydrant chamber and the piston chamber. The pilot valve return spring biases the pilot valve in the closed position.

The actuator comprises a pressure supply adaptor, an actuator plunger, an actuator return spring, an actuator body and a quick disconnect mechanism. The actuator operates the pilot valve through the application of pressure to the actuator plunger. The actuator plunger presses against the pilot valve stem in the pilot valve to move the pilot valve into an open position.

These and other aspects of the invention will be apparent to one skilled in the art in light of the following detailed description of the preferred embodiments.

BRIEF DESCRIPTION OF THE DRAWINGS

The following drawings illustrate the invention. In such drawings.

DETAILED DESCRIPTION OF THE PREFERRED EMBODIMENT

Figure 1:
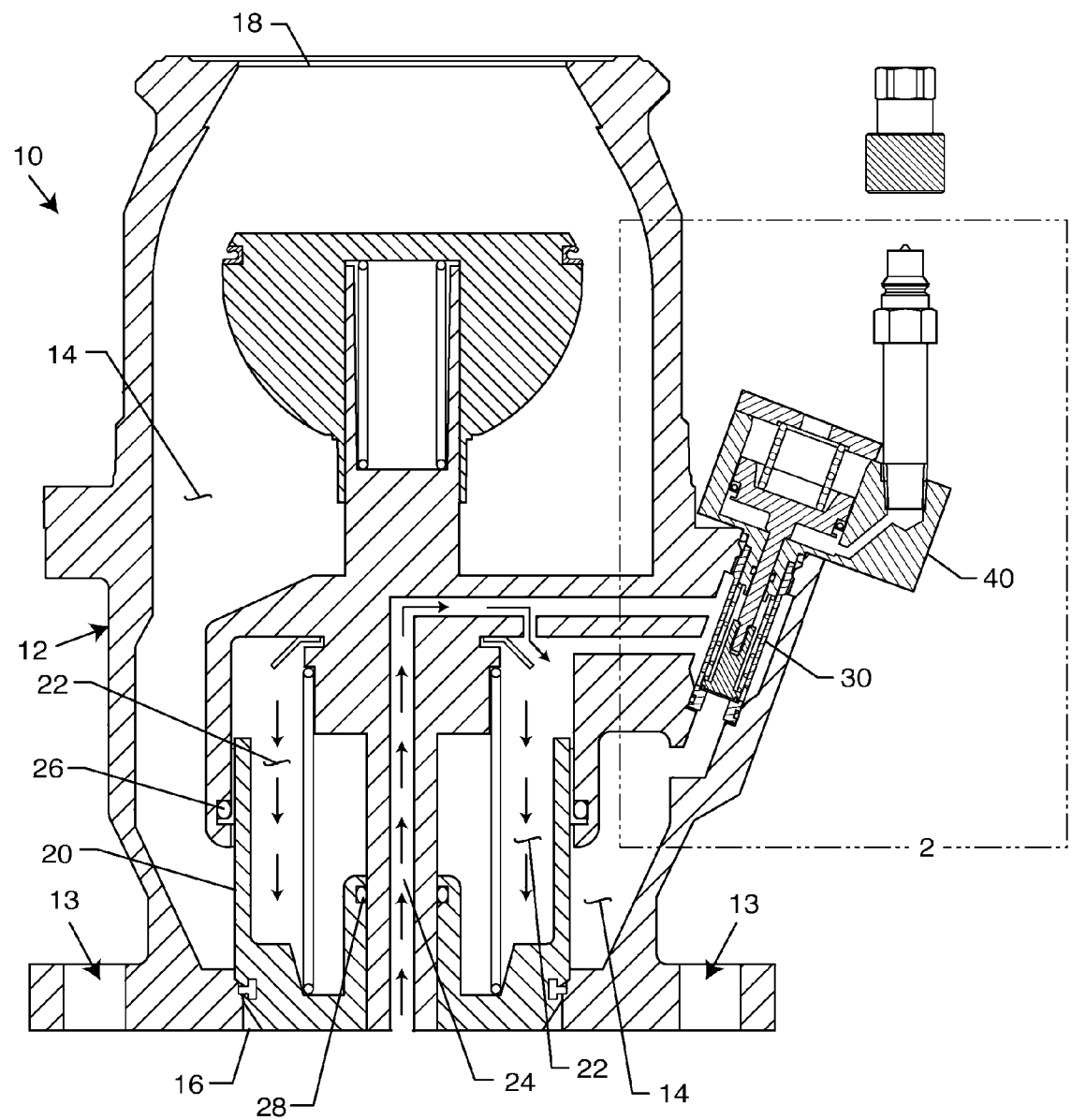
FIG. 1 is a sectional view of a prior art hydrant valve.
Figure 2:
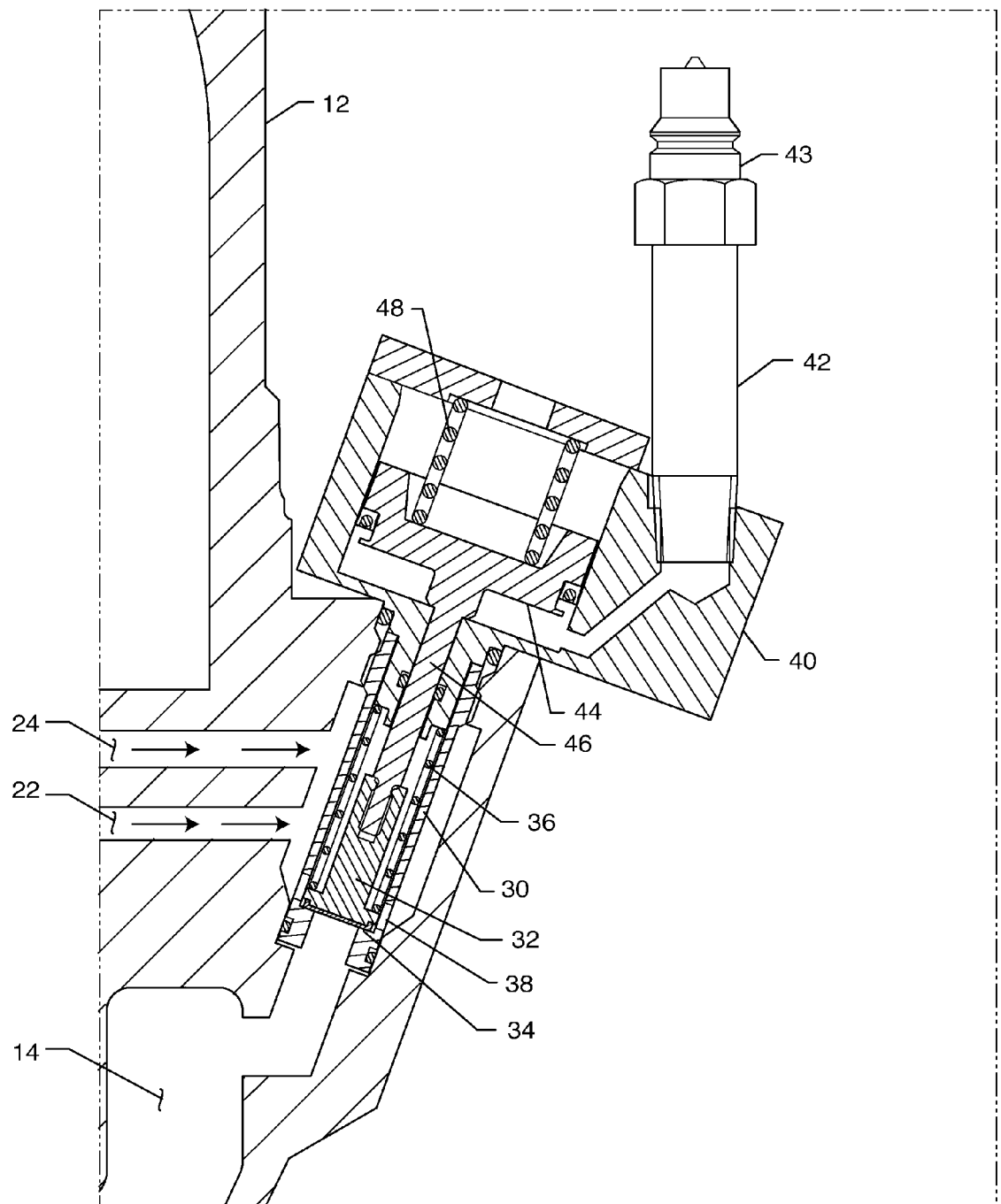
FIG. 2 is an enlarged sectional view of the area of FIG. 1 identified by Box 2.

The present invention relates to a pilot valve actuator for use with a hydrant valve. The pilot valve actuator of the present invention includes a novel pilot valve and a novel removable actuator for use with a hydrant valve.

As described above, a hydrant valve 10 consists of a hydrant body 12, a primary hydrant chamber 14, an inlet 16 and outlet 18 on the hydrant chamber 14, a piston 20, a piston chamber 22, a passageway 24, and seals 26 and 28. The pilot valve actuator 50 of the present invention replaces the pilot valve 30 and actuator 40 of the prior art.

Figure 3:
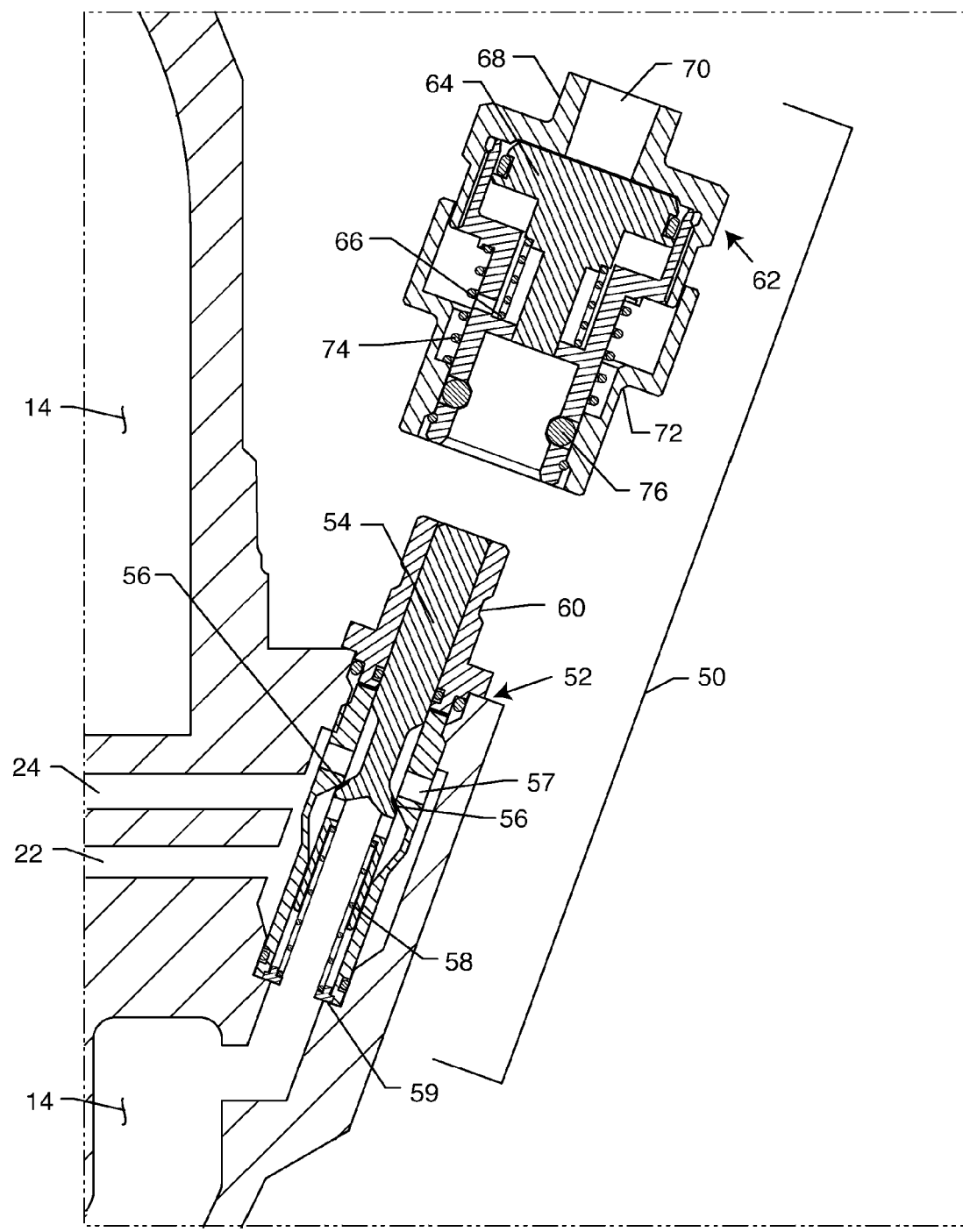
FIG. 3 is an exploded sectional view of a hydrant valve showing the pilot valve and actuator of the present invention.
Figure 4:
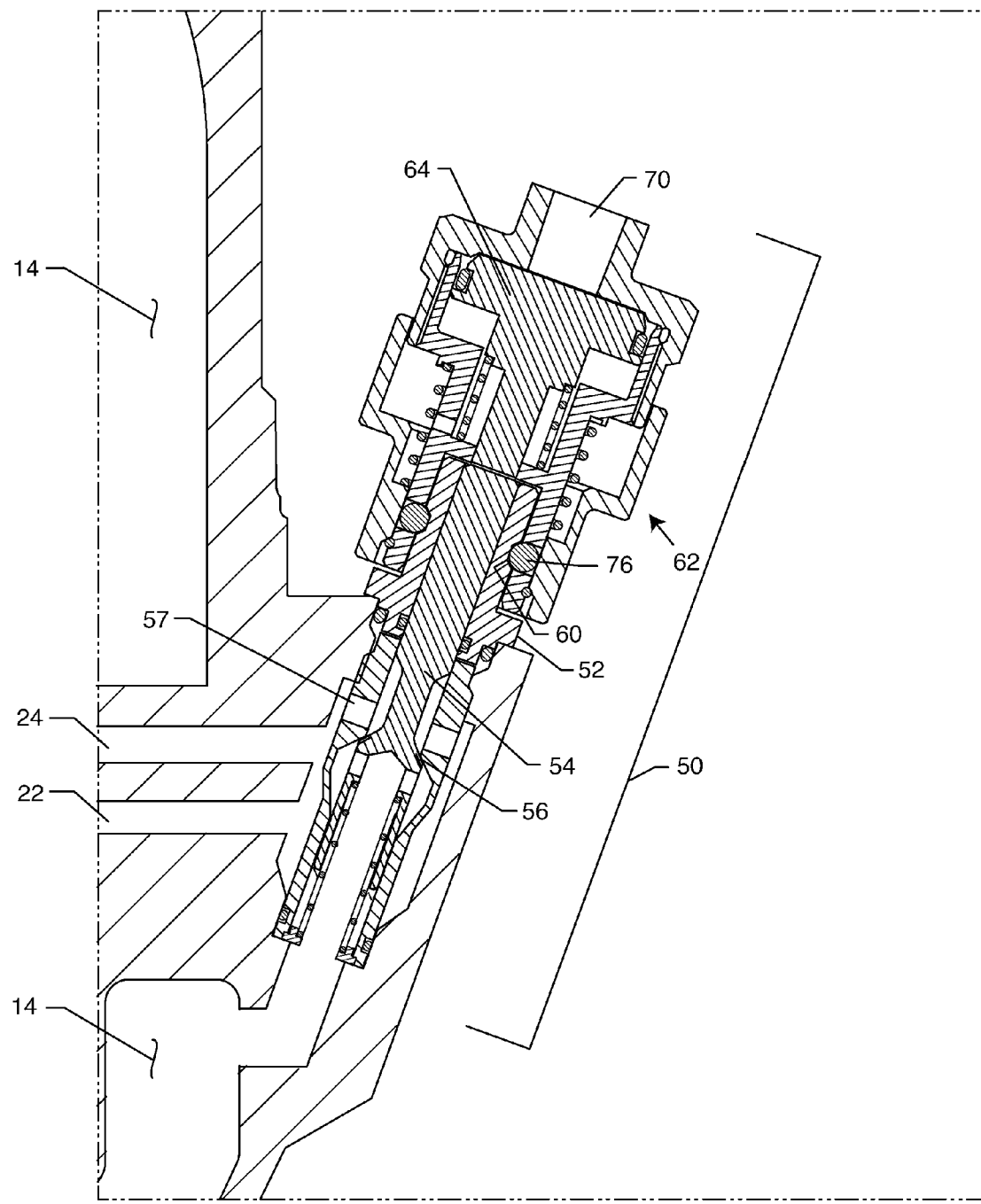
FIG. 4 is a sectional view of the hydrant valve of FIG. 3, showing the pilot valve and actuator of the present invention, the pilot valve being in the closed position.
Figure 5:
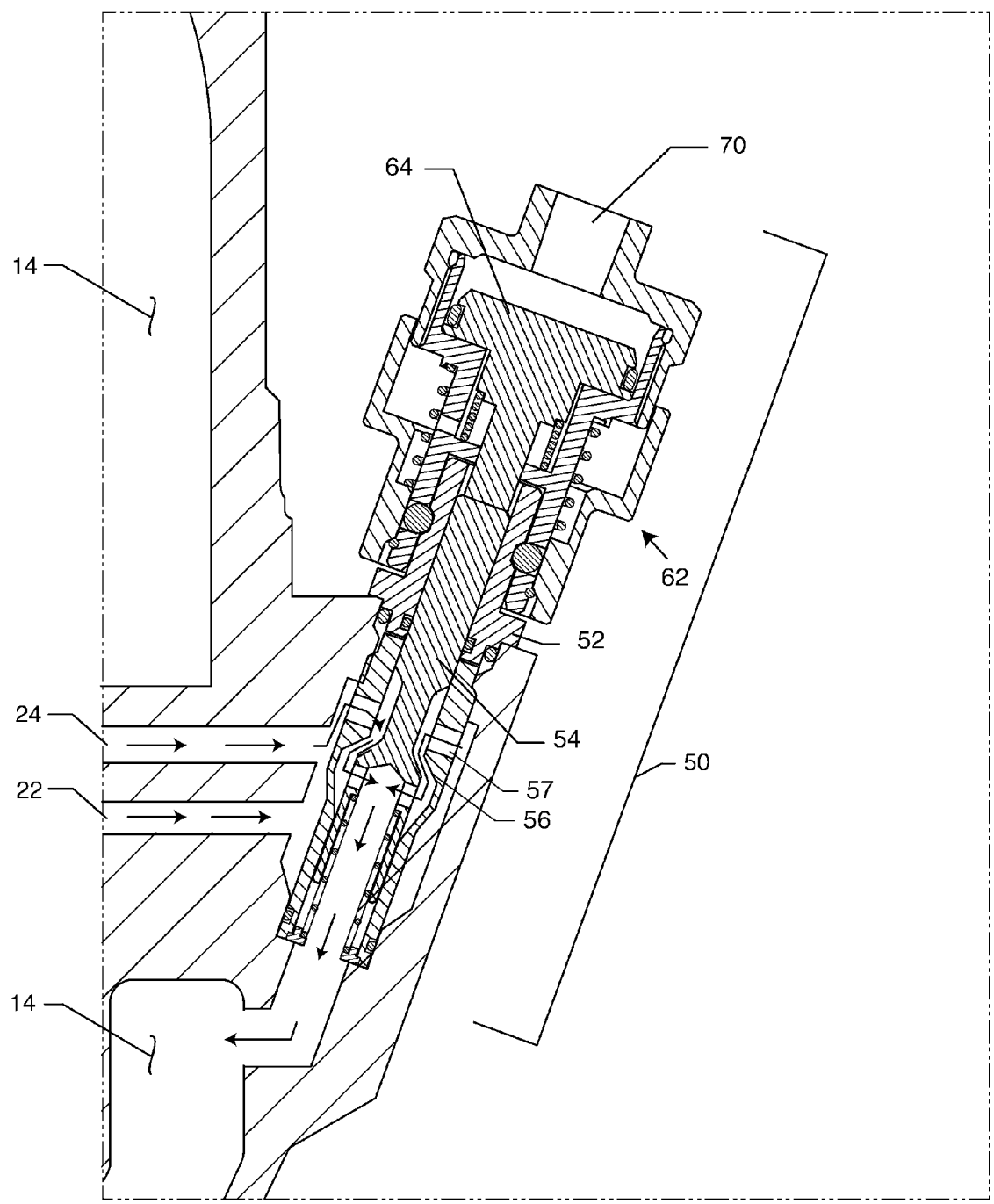
FIG. 5 is a sectional view of hydrant valve of FIGS. 3 and 4, showing the pilot valve and actuator of the present invention, the pilot valve being in the open position.

FIGS. 3-5 depict the assembly and operation of the pilot valve actuator 50. The pilot valve actuator 50 includes a pilot valve 52 and an actuator 62. The pilot valve 52 is permanently attached to the hydrant body 12 as the pilot valve 52 in the prior art. The pilot valve 52 is disposed between the primary hydrant chamber 14 and the piston chamber 22 thereby blocking communication between the two chambers when the pilot valve 52 is in a closed position. The pilot valve 52 includes a valve stem 54, a valve seat 56, pilot openings 57, a return spring 58, a spring retainer 59 and a connector assembly 60. When the valve stem 54 is moved away from the valve seat 56, the pilot valve 52 moves into the open position permitting the flow of fuel from the piston chamber 22 to the hydrant chamber 14 through pilot openings 57. The mechanism by which the valve stem 54 is moved away from the valve seat 56 will be described below.

The actuator 62 includes an actuator plunger 64, a plunger return spring 66, an actuator body 68, a pressure supply adaptor 70 and a quick disconnect mechanism comprising a collar 72, a collar return spring 74 and latching elements 76. The actuator 62 is connectable to and removable from the pilot valve 52 through the mating of the quick disconnect mechanism 72, 74, 76 with the pilot valve connector assembly 60. The latching elements 76 and mating connector 60 may include latching lugs, threaded screws or a ball latch. In operation, the collar return spring 74 maintains the collar 72 in an extended position. When the collar 72 is in an extended position it exerts a force on the latching elements 76 preventing them from disengaging a mated connector 60. When the collar 72 is retracted against the biasing force of the return spring 74, the latching elements 76 are permitted to disengage a mated connector 60. In this way the actuator 62 is removable from the pilot valve 52. The mechanism works in the reverse manner to connect the actuator 62 to the pilot valve 52.

The actuator return spring 66 biases the actuator plunger 64 in a retracted or closed position. When a pressure medium, i.e., pneumatic or hydraulic fluid, is introduced through the pressure supply adaptor 70, a force exerted on the plunger 64 moves the plunger to an extended or open position against the biasing force of the return spring 66. When the plunger 64 is in the extended position, it engages the pilot valve stem 54 thereby moving the pilot valve 52 into an open position as described above.

The actuator 62 is preferably removed from the pilot valve 52 when the hydrant valve 10 is not in use. The actuator 62 presents a sealed environment preventing the transfer of pressure medium, i.e., pneumatic or hydraulic fluid, to the pilot valve 52. When the actuator 62 is detached from the pilot valve 52 or when the actuator 62 is connected to the pilot valve 52 but no actuating pressure is applied through the adaptor 70, the pilot valve 52 stays closed. Upon the application of actuating pressure through the adaptor 70, the actuator 62 opens the pilot valve 52 as described above. Upon terminating actuating pressure through the adaptor 70 or detaching the actuator 62 from the pilot valve 52, the pilot valve return spring 58 again biases the valve stem 54 against the valve seat 56 closing the pilot valve 52 and the hydrant valve 10. The closure of the hydrant valve 10 will occur regardless of whether the actuating pressure through the adaptor 70 is terminated or the actuator 62 is removed from the pilot valve 52 while still under pressure. When the actuating pressure through the adaptor 70 is vented from the actuator 62, the actuator plunger return spring 66 again biases the plunger 64 in its retracted position—ready for its next use.

Although an embodiment has been described in some detail for purposes of illustration, various modifications may be made without departing from the scope and spirit of the invention. Accordingly, the invention is not to be limited, except as by the appended claims.

What is claimed is:

1. A pilot valve actuator for use with a hydrant valve including a primary hydrant chamber having an inlet and an outlet, a piston in the hydrant chamber movable between open and closed positions relative to the inlet, and a chamber disposed within the piston in communication with the inlet, the pilot valve actuator comprising:
   a pilot valve disposed between the primary hydrant chamber and the piston chamber wherein the pilot valve comprises a pilot valve stem biased against a pilot valve seat to block communication between the primary hydrant chamber and the piston chamber, thereby preventing fluid from flowing through the hydrant valve; and
   an actuator removably connected to the pilot valve by a quick disconnect mechanism comprising an actuating collar, a collar return spring biasing the collar in a closed position and latching elements on the actuator mated to a connector on the pilot valve, the actuator for selectively opening the pilot valve wherein the actuator comprises an actuator plunger biased in a retracted position such that the application of pressure to the actuator plunger moves the actuator plunger to an extended position thus pressing against the pilot valve stem to open the pilot valve, thereby allowing fluid to flow through the hydrant valve.

2. The pilot valve actuator of claim 1, wherein the latching elements and mating connector comprise latching lugs, threaded screws or a ball latch.

3. The pilot valve actuator of claim 1, wherein the pilot valve stem is biased against the pilot valve seat by a pilot valve return spring.

4. The pilot valve actuator of claim 1, wherein the actuator plunger is biased in the retracted position by an actuator return spring.

5. The pilot valve actuator of claim 1, wherein the actuator plunger is moved to an extended position through the application of pneumatic or hydraulic pressure through a pressure supply adaptor.

6. A pilot valve actuator for use with a hydrant valve including a primary hydrant chamber having an inlet and an outlet, a piston in the hydrant chamber movable between open and closed positions relative to the inlet, and a chamber disposed within the piston in communication with the inlet, the pilot valve actuator comprising:
   a pilot valve disposed between the primary hydrant chamber and the piston chamber wherein the pilot valve comprises a pilot valve stem biased against a pilot valve seat to block communication between the primary hydrant chamber and the piston chamber, thereby preventing fluid from flowing through the hydrant valve; and
   an actuator having an actuator return spring biasing an actuator plunger in a retracted position such that the application of pressure to the actuator plunger moves the actuator plunger to an extended position, the actuator being removably connected to the pilot valve by a quick disconnect mechanism, mechanism comprising an actuating collar, a collar return spring biasing the collar in a closed position and latching elements on the actuator mated to a connector on the pilot valve, wherein the actuator selectively opens the pilot valve when the actuator plunger is in the extended position pressing against the pilot valve stem, thereby causing the piston to move from the closed to open position and allowing fluid to flow through the hydrant valve.

7. The pilot valve actuator of claim 6, wherein the latching elements and mated connector comprise latching lugs, threaded screws or a ball latch.

8. The pilot valve actuator of claim 6, wherein the pilot valve stem is biased against the pilot valve seat by a pilot valve return spring.

9. The pilot valve actuator of claim 6, wherein the actuator plunger is moved to the extended position through the application of pneumatic or hydraulic pressure through a pressure supply adaptor.

10. A pilot valve actuator for use with a hydrant valve including a primary hydrant chamber having an inlet and an outlet, a piston in the hydrant chamber movable between open and closed positions relative to the inlet, and a chamber disposed within the piston in communication with the inlet, the pilot valve actuator comprising:
   a pilot valve disposed between the primary hydrant chamber and the piston chamber wherein the pilot valve comprises a pilot valve stem biased against a pilot valve seat to block communication between the primary hydrant chamber and the piston chamber, thereby preventing fluid from flowing through the hydrant valve; and
   an actuator having an actuator return spring biasing an actuator plunger in a retracted position, the actuator being removably connected to the pilot valve by a quick disconnect mechanism comprising an actuating collar, a collar return spring biasing the collar in a closed position and latching elements on the actuator mated to a connector on the pilot valve, wherein the application of pressure to the actuator plunger causes the actuator plunger to press against the pilot valve stem to selectively open the pilot valve, thereby causing the piston to move from the closed to open position and allowing fluid to flow through the hydrant valve.

11. The pilot valve actuator of claim 10, wherein the latching elements and mated connector comprise latching lugs, threaded screws or a ball latch.

12. The pilot valve actuator of claim 10, wherein the pilot valve stem is biased against the pilot valve seat by a pilot valve return spring.

13. The pilot valve actuator of claim 10, wherein the application of pressure to the actuator plunger moves the actuator plunger to an extended position.

14. The pilot valve actuator of claim 13, wherein the actuator plunger is moved to an extended position through the application of pneumatic or hydraulic pressure through a pressure supply adaptor.

15. The pilot valve actuator of claim 13, wherein the actuator plunger in the extended position presses against the pilot valve stem in the pilot valve.

* * * * *